(12) United States Patent
Aiello et al.

(10) Patent No.: US 7,073,944 B2
(45) Date of Patent: Jul. 11, 2006

(54) FLUID DYNAMIC BEARING CONFIGURED WITH AN ORBITAL RING FOR HIGHER EFFICIENCY

(75) Inventors: Anthony Joseph Aiello, Aptos, CA (US); Klaus Dieter Kloeppel, Watsonville, CA (US)

(73) Assignee: Seagate Technology LLC, Scotts Valley, CA (US)

(*) Notice: Subject to any disclaimer, the term of this patent is extended or adjusted under 35 U.S.C. 154(b) by 74 days.

(21) Appl. No.: 10/676,672

(22) Filed: Sep. 30, 2003

(65) Prior Publication Data

US 2005/0069232 A1    Mar. 31, 2005

Related U.S. Application Data

(60) Provisional application No. 60/415,152, filed on Sep. 30, 2002.

(51) Int. Cl.
*F16C 17/10* (2006.01)

(52) U.S. Cl. .................................... 384/107; 384/901
(58) Field of Classification Search ............... 384/901, 384/114, 119, 107, 120
See application file for complete search history.

(56) References Cited

U.S. PATENT DOCUMENTS

| 4,613,288 A | * | 9/1986 | McInerney | ................. 384/901 |
| 5,223,758 A | | 6/1993 | Kataoka | |
| 5,423,612 A | | 6/1995 | Zang | |
| 6,154,339 A | | 11/2000 | Grantz | |

* cited by examiner

*Primary Examiner*—Lenard A. Footland
(74) *Attorney, Agent, or Firm*—Morrison & Foerster LLP

(57) ABSTRACT

A fluid dynamic bearing assembly is described. In one embodiment, the assembly includes an inner member. The assembly further includes an outer member configured to rotate about a rotational axis at a first angular velocity. The assembly also includes an orbital ring disposed between the inner member and the outer member. The orbital ring is configured to rotate about the rotational axis at a second angular velocity, which is less than the first angular velocity.

7 Claims, 10 Drawing Sheets

FLUID DYNAMIC BEARING CONFIGURED WITH AN ORBITAL RING FOR HIGHER EFFICIENCY

CROSS-REFERENCE TO RELATED APPLICATION

This application relates to, and claims the priority benefit of, U.S. Provisional Patent Application No. 60/415,152, titled "Orbital Ring Fluid Dynamic Bearing Motor," filed on Sep. 30, 2002. The subject matter of the related application is hereby incorporated by reference.

BACKGROUND OF THE INVENTION

1. Field of the Invention

This invention relates generally to fluid dynamic bearings and more specifically to a fluid dynamic bearing assembly configured with an orbital ring that rotates at a fractional speed, thereby increasing the overall stiffness-to-power ratio of the assembly.

2. Description of the Background Art

FIG. 1 is an exploded perspective view illustrating a prior art magnetic disc drive 100. As shown, magnetic disc drive 100 may include, without limitation, a housing 105, a shaft 130, discs 135 and a suspension arm assembly 150. Housing 105 includes a base 110 that is attached to a cover 115. In addition, a seal 120 may be disposed in between base 110 and cover 115. Discs 135, which have surfaces 140 covered with a magnetic media configured to store information magnetically, are coupled to shaft 130. During operation, suspension arm assembly 150 is configured to suspend read/write heads 145 above surfaces 140 as a fluid dynamic bearing motor (not shown) rotates discs 135 about shaft 130 at high speed. Suspension arm assembly 150 is further configured to move read/write heads 145 radially across surfaces 140 to position read/write heads 145 above different radially spaced tracks (not shown) disposed on surfaces 140 where magnetically encoded information may be stored within the magnetic media. Once positioned, read/write heads 145 may either read magnetically encoded information from or write magnetically encoded information to the magnetic media at selected locations.

FIG. 2 is a cross-sectional view illustrating a prior art fluid dynamic bearing motor assembly 200. As shown, a central fixed shaft 250 has a thrust plate 252 disposed on one end. Shaft 250 is fixed relative to a sleeve 254. Thrust plate 252 sits within a recess 256 defined by sleeve 254. A counter-plate 258 is attached to sleeve 254. At its other end, shaft 250 includes a shoulder 262, which rests on an upraised portion 264 of a base 266. A shaft extension 268 is attached to base 266. A hub 274 is supported on the outside surface of sleeve 254, and a magnet 276, also disposed on the outside surface of sleeve 254, is aligned with a stator 278, which is supported from base 266. Electromagnetic interaction between magnet 276 and stator 278 causes hub 274 to rotate. Hub 274 is configured to support one or more discs (not shown) as it rotates. Bearing fluid fills gap 277 between the surfaces of shaft 250 and the surrounding sleeve 254. Bearing fluid also fills gaps 279 and 281 between surfaces of thrust plate 252 and facing surfaces of sleeve 254 and counter plate 258. As is well known to persons skilled in the art, appropriate pumping grooves (not shown) are provided along one or more surfaces of gaps 277, 279 and 281 to maintain the fluid dynamic bearings that support hub 274 and sleeve 254 as they rotate.

Fluid dynamic bearings tend to generate less vibration and non-repetitive run-out in the rotating parts of motors than ball bearings and other types of bearings. For this reason, fluid dynamic bearing motors, such as fluid dynamic bearing motor assembly 200 described above in conjunction with FIG. 2, are oftentimes used in precision-oriented electronic devices to achieve better performance. For example, using a fluid dynamic bearing motor in a magnetic disc drive, such as magnetic disc drive 100 described above in conjunction with FIG. 1, results in more precise alignment between the tracks of the discs and the read/write heads. More precise alignment, in turn, allows discs to be designed with greater track densities, thereby allowing smaller discs and/or increasing the storage capacity of the discs.

As persons skilled in the art are aware, an ongoing challenge in fluid dynamic bearing motor design is balancing the tradeoff between motor performance and power consumption. On the one hand, increasing the stiffness of the fluid dynamic bearings results in less vibration in the motor's rotating parts and, therefore, increased motor precision and performance. On the other hand, however, increasing bearing stiffness results in greater power consumption because of increased viscous losses in the bearings. Conversely, decreasing the power consumption of the fluid dynamic bearings typically requires a substantial decrease in bearing stiffness and, hence, decreased motor performance.

SUMMARY OF THE INVENTION

One embodiment of a fluid dynamic bearing assembly includes an inner member. The assembly further includes an outer member configured to rotate about a rotational axis at a first angular velocity. The assembly also includes an orbital ring disposed between the inner member and the outer member. The orbital ring is configured to rotate about the rotational axis at a second angular velocity, which is less than the first angular velocity.

The disclosed assembly is especially useful in fluid dynamic bearing motors. One advantage of the disclosed assembly is that a fluid dynamic bearing motor using the disclosed assembly consumes substantially less power than a fluid dynamic bearing motor not using the disclosed assembly. Further, if the gap sizes of the fluid dynamic bearings included in the disclosed assembly are decreased appropriately, the overall stiffness of the assembly does not decrease appreciably.

DETAILED DESCRIPTION OF THE INVENTION

Figure 1:
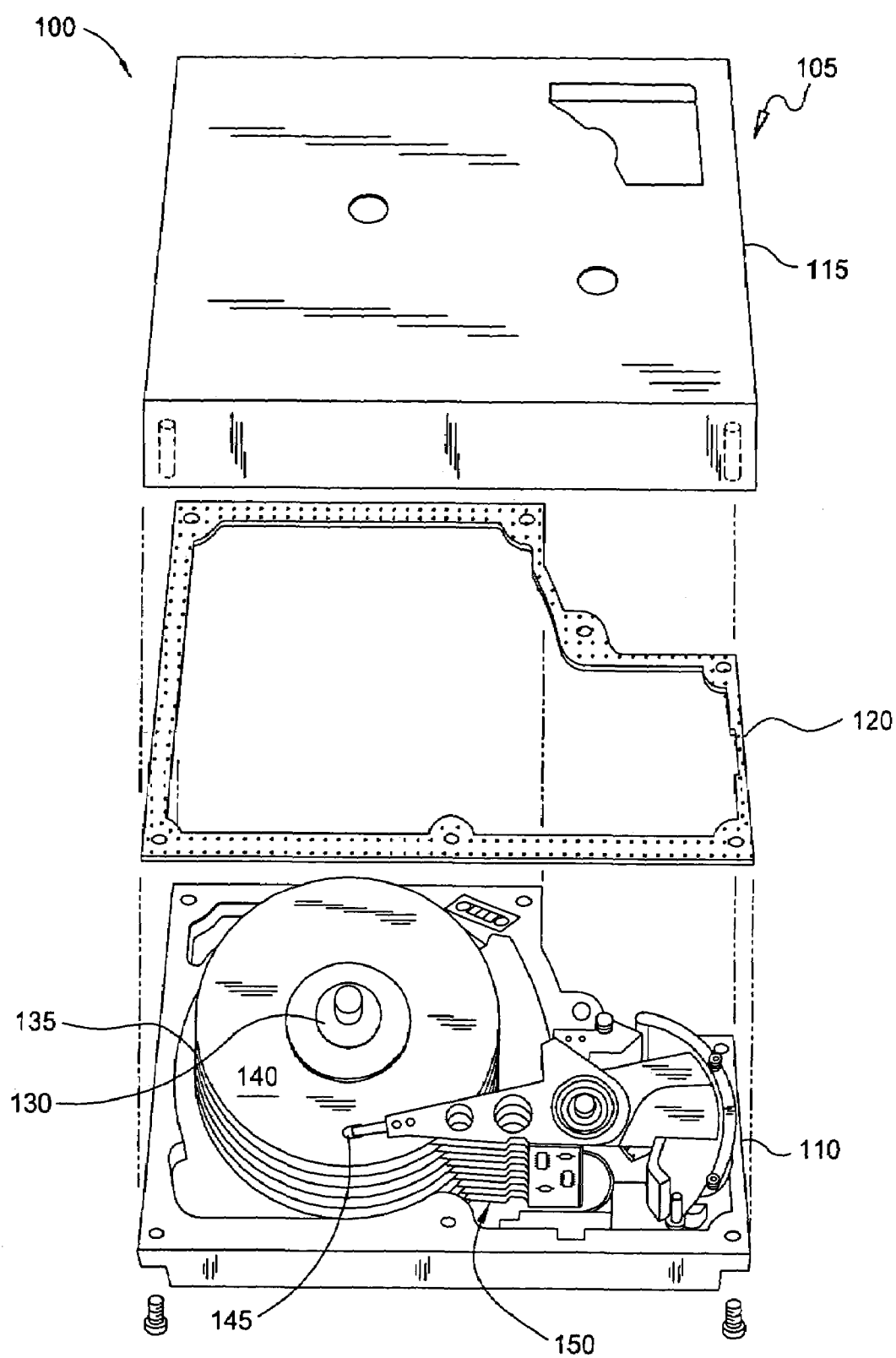
FIG. 1 is an exploded perspective view illustrating a prior art magnetic disc drive.
Figure 2:
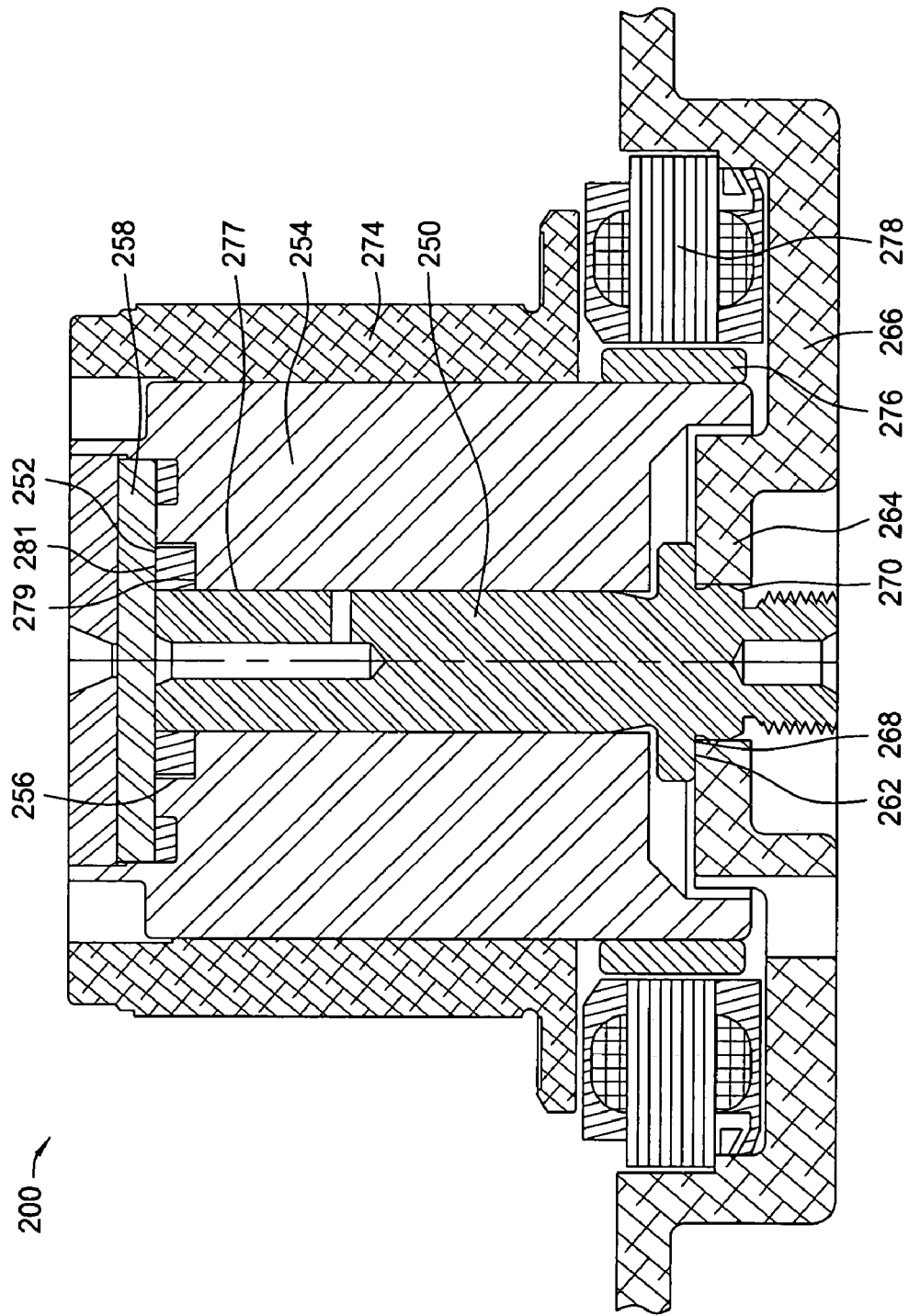
FIG. 2 is a cross-sectional view illustrating a prior art fluid dynamic bearing motor assembly.
Figure 3:
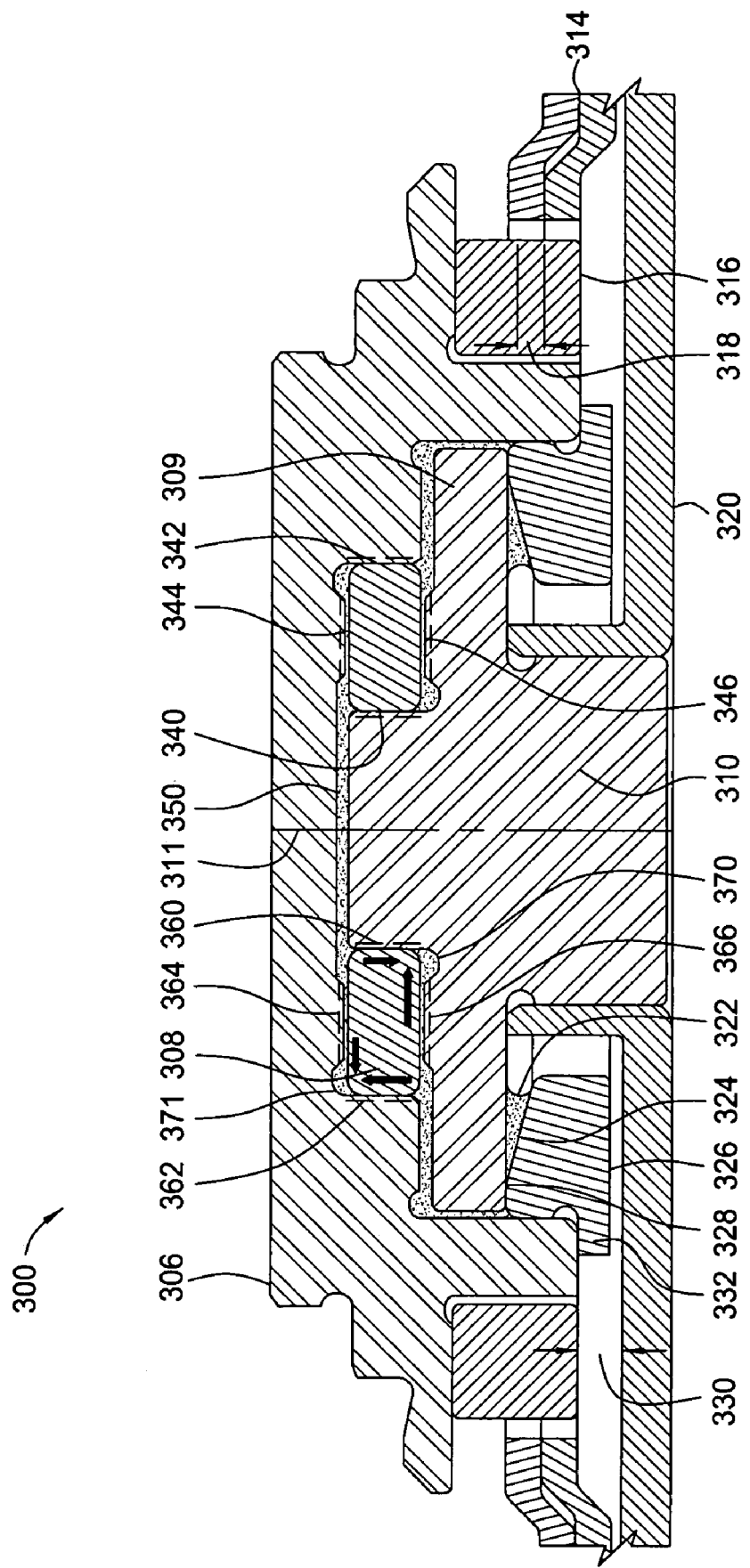
FIG. 3 is a cross-sectional view illustrating an orbital ring in a fluid dynamic bearing motor assembly, according to one embodiment of the invention.

FIG. 3 is a cross-sectional view illustrating an orbital ring 308 in a fluid dynamic bearing motor assembly 300, according to one embodiment of the invention. As shown, fluid dynamic bearing motor assembly (hereinafter also referred to as "FDB motor assembly") 300 may include, without limitation, a hub 306, orbital ring 308, a shaft 310, a stator assembly 314 (partially shown), a magnet 316, a base 320, a seal 322 and a displacement limiter 326.

Shaft 310 is attached to base 320 and supports FDB motor assembly 300. In this embodiment, shaft 310 is stationary. As described in further detail below, in other embodiments, shaft 310 may rotate about a rotational axis 311. Hub 306 is configured to rotate about rotational axis 311. Specifically, magnet 316 is attached to hub 306, and the electromagnetic interaction between magnet 316 and stator assembly 314 causes hub 306 to rotate. As hub 306 rotates, fluid dynamic journal bearings 360 and 362 radially support hub 306, and fluid dynamic thrust bearings 364 and 366 axially support hub 306.

Orbital ring 308 (which also may be called a "fractional shear ring") is disposed between hub 306 and shaft 310 and is configured to rotate about rotational axis 311. More specifically, bearing fluid fills a bearing gap 340 between the inner radial surface of orbital ring 308 and the facing surface of shaft 310, a bearing gap 342 between the outer radial surface of orbital ring 308 and the facing surface of hub 306, a bearing gap 344 between the top axial surface of orbital ring 308 and the facing surface of hub 306 and a bearing gap 346 between the bottom axial surface of orbital ring 308 and the facing surface of shaft 310. As hub 306 rotates about rotational axis 311, the bearing fluid in bearing gaps 342 and 344 exerts shear forces on the outer radial and top axial surfaces of orbital ring 308, respectively. The torques resulting from these shear forces cause orbital ring 308 to rotate about rotational axis 311 in the same direction as hub 306. In addition, the bearing fluid in bearing gaps 340 and 346 exerts shear forces on the inner radial and bottom axial surfaces of orbital ring 308, respectively. Because shaft 310 is stationary, the torques resulting from these shear forces resist the rotation of orbital ring 308 about rotational axis 311 caused by the rotation of hub 306. Orbital ring 308 reaches a steady-state angular velocity about rotational axis 311 (in the same direction as hub 306) when the torques acting on the various surfaces of orbital ring 308 are in balance with one another. As orbital ring 308 rotates, a fluid dynamic journal bearing 360 radially supports orbital ring 308, and a fluid dynamic thrust bearing 366 axially supports orbital ring 308.

Persons skilled in the art will understand that the configurations of fluid dynamic journal bearings 360 and 362 and fluid dynamic thrust bearings 364 and 366, including the configurations of bearing gaps 340, 342, 344 and 346, determine the angular velocity of orbital ring 308 relative to that of hub 306. Persons skilled in the art also will understand that the resulting angular velocity of orbital ring 308 is less than that of hub 306 and that different angular velocities of orbital ring 308 may be achieved by adjusting the configurations of fluid dynamic journal bearings 360 and 362 and fluid dynamic thrust bearings 364 and 366. Persons skilled in the art will therefore recognize that the angular velocity of orbital ring 308 in no way limits the scope of the invention.

Each of fluid dynamic journal bearings 360 and 362 and fluid dynamic thrust bearings 364 and 366 includes at least one bearing surface having a grooved bearing pattern. As is commonly known in the art, these grooved bearing patterns are configured to generate a localized high pressure region within the bearing fluid when the surfaces of a fluid dynamic bearing rotate relative to one another. Thus, as orbital ring 308 rotates about rotational axis 311 relative to shaft 310, the high pressure region generated locally to fluid dynamic journal bearing 360 provides radial support between orbital ring 308 and shaft 310. As hub 306 rotates about rotational axis 311 and relative to orbital ring 308, the high pressure region generated locally to fluid dynamic journal bearing 362 provides radial support between hub 306 and orbital ring 308. As hub 306 rotates about rotational axis 311 and relative to orbital ring 308, the high pressure region generated locally to fluid dynamic thrust bearing 364 provides axial support between hub 306 and orbital ring 308. Likewise, as orbital ring 308 rotates about rotational axis 311 relative to shaft 310, the high pressure region generated locally to fluid dynamic thrust bearing 366 provides axial support between orbital ring 308 and shaft 310.

The grooved bearing surfaces of fluid dynamic journal bearings 360 and 362 and fluid dynamic thrust bearings 364 and 366 may include any suitable type of grooved bearing pattern, including, without limitation, a pattern of spiral grooves or a pattern of chevron grooves. Further, as persons skilled in the art will recognize, any of shaft 310, orbital ring 308 or hub 306 may include one or more bearing surfaces having a grooved bearing pattern. Persons skilled in the art also will understand that a fluid dynamic bearing may comprise one or more sets of grooves.

The bearing fluid used in FDB motor assembly 300 may be any type of suitable liquid or gas. For example, in one embodiment, the bearing fluid comprises a liquid such as oil. In an alternative embodiment, the bearing fluid may comprise a ferromagnetic fluid. In another alternative embodiment, the bearing fluid may comprise air. In yet other alternative embodiments, the bearing fluid may comprise any other suitable type of gas.

In a preferred approach, fluid dynamic journal bearings 360 and 362 are configured asymmetrically such that each pumps bearing fluid towards a corner 370 and a corner 371, respectively. Likewise, fluid dynamic thrust bearings 364 and 366 are configured asymmetrically such that each pumps bearing fluid towards corner 371 and 370, respectively. Among other things, this pumping action maintains the pressure of the bearing fluid in corners 370 and 371 above ambient pressure (also referred to as "positive" pressure), thereby preventing air from being drawn out of the bearing fluid—a phenomenon that is detrimental to fluid dynamic bearing performance in cases where the bearing fluid is a liquid. Further, fluid dynamic journal bearing 362 and fluid dynamic thrust bearing 364 are configured such that the pumping action of fluid dynamic journal bearing 362 towards corner 371 is greater than that of fluid dynamic thrust bearing 364 towards corner 371. Similarly, fluid dynamic journal bearing 360 and fluid dynamic thrust bearing 366 are configured such that the pumping action of fluid dynamic thrust bearing 366 towards corner 370 is greater than that of fluid dynamic journal bearing 360 towards corner 370. As persons skilled in the art will understand, these imbalances create a positive pressure in a gap 350 between the top surface of shaft 310 and the facing surface of hub 306. Again, maintaining positive pressure in gap 350 prevents the formation of air bubbles in the bearing fluid in cases where the bearing fluid is a liquid. In addition, the positive pressure in gap 350 supplements the axial forces generated by fluid dynamic thrust bearings 364 and 366.

In alternative embodiments, each of fluid dynamic journal bearings 360 and 362 and fluid dynamic thrust bearings 364 and 366 may have any configuration and may pump bearing fluid in any direction so long as orbital ring 308 functions as intended. Further, each such bearing may be disposed in any suitable location. Persons skilled in the art therefore will recognize that neither the configurations nor the locations of fluid dynamic journal bearings 360 and 362 or fluid dynamic thrust bearings 364 and 366 in any way limits the scope of the invention.

Seal 322 is configured to seal the bearing fluid within gaps 340, 342, 346, 348 and 350. In one embodiment, seal 322 comprises a centrifugal capillary seal. In alternative embodiments, seal 322 may comprise a groove pumping seal or some other type of capillary seal, such as a radial capillary seal or an axial capillary seal. In yet other alternative embodiments, seal 322 may comprise any other type of seal capable of sealing the bearing fluid within bearing gaps 340, 342, 344 and 346 and gap 350. Persons skilled in the art will recognize that if the bearing fluid comprises a gas such as air, then seal 322 may become unnecessary.

Displacement limiter 326 is attached to hub 306 and is configured to provide a seal surface 324 to the extent that seal 322 comprises a capillary seal. Displacement limiter 326 is further configured with a shoulder 328 and a lip 332. As shown, shoulder 328 is disposed in close proximity to a flange 309 of shaft 310, and lip 332 is disposed against the bottom surface of hub 306. As configured, shoulder 328 acts to limit the upward displacement of hub 306 when FDB motor assembly 300 experiences displacement shocks in the axially upward direction.

FDB motor assembly 300 also may be configured such that a downward acting preloading force is exerted on hub 306. In one embodiment, magnet 316 and stator assembly 314 are disposed such that an offset 318 separates the center of magnet 316 and the center of stator assembly 314. The axial electromagnetic force generated between magnet 316 and stator assembly 314 acts to axially align the centers of each assembly. The result is that an axially downward net force is exerted on magnet 316 (and therefore hub 306) that attempts to realign the centers of magnet 316 and stator assembly 314. The magnitude of this preloading force is a function of, among other things, the size of offset 318. In an alternative embodiment, base 320 and magnet 316 may be separated by a gap 330. Base 320 also may comprise a magnetic metal such as a Series 400 steel or a low carbon steel. In such a configuration, an axially downward magnetic force results that pulls magnet 316 (and therefore hub 306) towards base 320. The magnitude of this preloading force is a function of, among other things, the size of gap 330. In other alternative embodiments, the preloading force may be created in any other feasible way such as, for example, by applying a spring force or a downward-acting pressure force on hub 306.

As persons skilled in the art will recognize, the downward acting preloading force tends to close bearing gaps 344 and 346. As hub 306 and orbital ring 308 reach their angular velocities during operation, the high pressure regions in the bearing fluid generated locally to fluid dynamic thrust bearings 364 and 366 tend to open bearing gaps 344 and 346. The size of each of bearing gaps 344 and 346 therefore is a function of, among other things, the angular velocities of hub 306 and orbital ring 308, the configurations of fluid dynamic thrust bearings 364 and 366, the bearing fluid pressure in gap 350 and the magnitude of the downward acting preloading force.

The power consumed by a fluid dynamic bearing is a function of, among other things, the square of the relative velocity between its two bearing surfaces. Because the motion of orbital ring 308 relative to hub 306 and shaft 310 effectively decreases the relative velocity between the bearing surfaces of fluid dynamic journal bearings 360 and 362 and fluid dynamic thrust bearings 364 and 366, orbital ring 308 substantially decreases the power consumption of FDB motor assembly 300. For example, in one embodiment, FDB motor assembly 300 is configured such that the angular velocity of orbital ring 308 is approximately half that of hub 306. As shaft 310 is stationary, the difference in the velocities of the bearing surfaces of fluid dynamic journal bearings 360 and 362 and fluid dynamic thrust bearings 364 and 366 is approximately one half of the angular velocity of hub 306. By contrast, if orbital ring 308 is not included in FDB motor assembly 300, and assuming that FDB motor assembly 300 therefore includes only one fluid dynamic journal bearing and one fluid dynamic thrust bearing, then the difference in the velocities of the bearing surfaces of the fluid dynamic bearings is simply the angular velocity of hub 306. Because including orbital ring 308 reduces the difference in bearing surface velocities by one half, each of fluid dynamic journal bearings 360 and 362 and fluid dynamic thrust bearings 364 and 366 consumes approximately one fourth the power that each of the fluid dynamic bearings consumes if orbital ring 308 is not included in FDB motor assembly 300. FDB motor assembly 300 with orbital ring 308 therefore consumes substantially less power than FDB motor assembly 300 without orbital ring 308 consumes, even though FDB motor assembly 300 with orbital ring 308 includes twice the number of fluid dynamic bearings.

Persons skilled in the art will recognize that, as configured, the radial stiffnesses of fluid dynamic journal bearings 360 and 362 act in series as do the axial stiffnesses of fluid dynamic thrust bearings 364 and 366. The effective stiffness of two springs acting in series typically is lower than the stiffness of either of the springs individually. For example, the effective stiffness of two springs with equal stiffnesses acting in series is one half the stiffness of either of the springs individually. Thus, assuming that FDB motor assembly 300 without orbital ring 308 includes only one fluid dynamic journal bearing and one fluid dynamic thrust bearing, one runs the risk of substantially decreasing the effective radial and axial stiffnesses of FDB motor assembly 300 by including orbital ring 308.

Persons skilled in the art also will understand, however, that the radial stiffness of fluid dynamic journal bearings and the axial stiffness of fluid dynamic thrust bearings are a function of, among other things, the inverse of the bearing gap size raised to the third power. As the stiffness of fluid dynamic bearings is highly sensitive to bearing gap size, fluid dynamic journal bearings 360 and 362 and fluid dynamic thrust bearings 364 and 366 may be configured with small bearing gaps 340, 342, 344 and 346, respectively, to compensate for the loss of effective stiffness resulting from the fact that the radial stiffnesses of fluid dynamic journal bearings 360 and 362 and the axial stiffnesses of fluid dynamic thrust bearings 364 and 366 act in series. Further, because power consumption of fluid dynamic bearings is proportional to the inverse of bearing gap size, and therefore not as sensitive to a change in bearing gap size, decreasing the size of bearing gaps 340, 342, 344 and 346 causes only a disproportionately small increase in the amount of power consumed by FDB motor assembly 300.

In sum, configuring fluid dynamic journal bearings 360 and 362 and fluid dynamic thrust bearings 364 and 366 with smaller bearing gaps 340, 342, 344 and 346, respectively, may result in FDB motor assembly 300 with orbital ring 308 consuming substantially less power than FDB motor assembly 300 without orbital ring 308 without any appreciable loss in radial, axial or angular stiffness.

The following describes several other embodiments of the invention. Persons skilled in the art will understand that the same general principles set forth above apply to each of these other embodiments. For this reason, the following descriptions focus primarily on the differences between each of these other embodiments and the embodiment described above in conjunction with FIG. 3.

Figure 4:
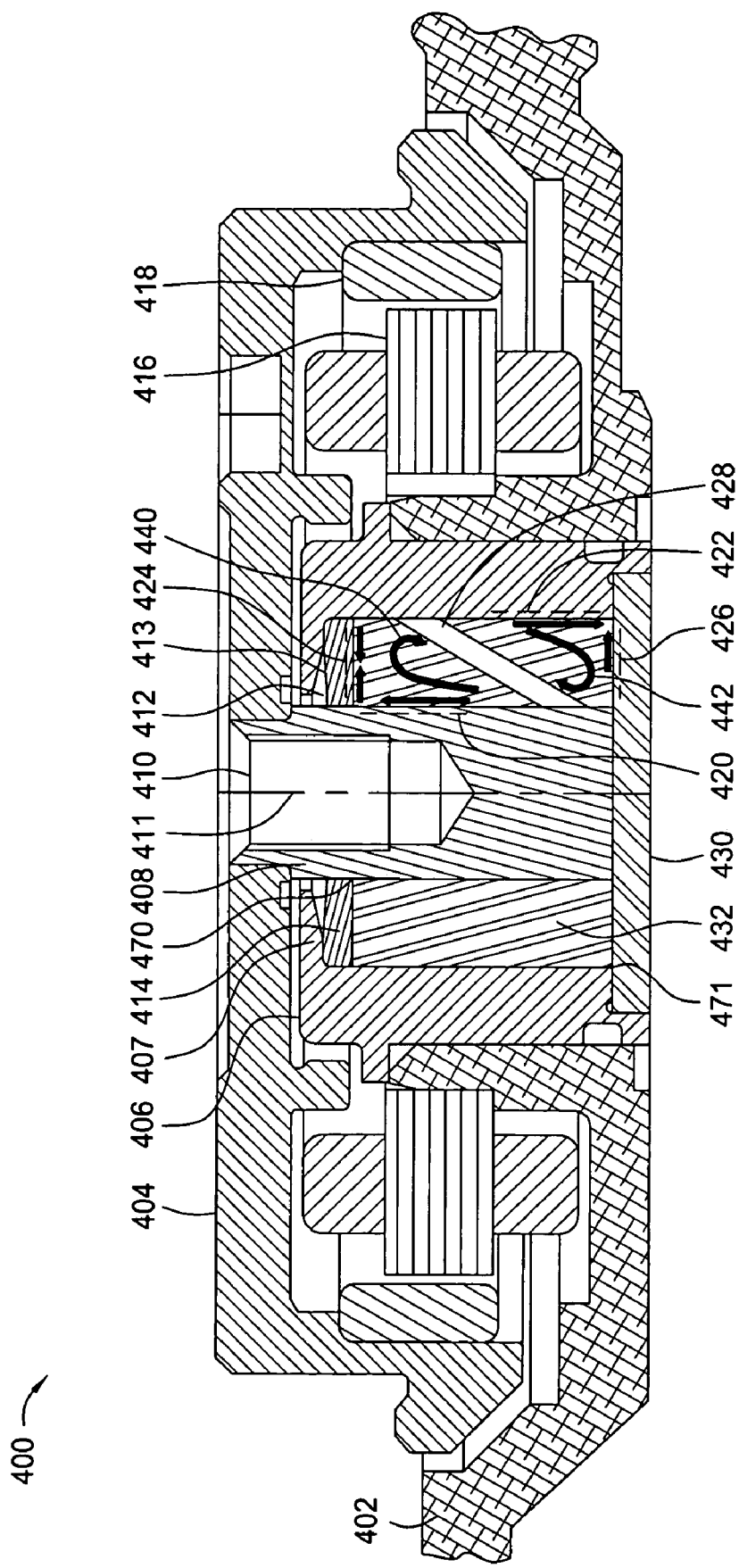
FIG. 4 is a cross-sectional view illustrating an orbital ring in a fluid dynamic bearing motor assembly, according to an alternative embodiment of the invention.

FIG. 4 is a cross-sectional view illustrating an orbital ring 432 in a fluid dynamic bearing motor assembly 400, according to an alternative embodiment of the invention. As shown, FDB motor assembly 400 may include, without limitation, a base 402, a hub 404, a sleeve 406, a shaft 408, a seal 412, a displacement limiter ring 414, a stator assembly 416, a magnet 418, a counter plate 430 and orbital ring 432.

Sleeve 406 is attached to base 402 and supports FDB motor assembly 400. As configured, sleeve 406 is stationary. Hub 404 is configured to rotate about a rotational axis 411. Specifically, magnet 418 is attached to hub 404, and the electromagnetic interaction between magnet 418 and stator assembly 416 causes hub 404 to rotate. Shaft 408 is attached to hub 404. In one embodiment, shaft 408 is attached to hub 404 by an interference fit or adhesive bond. As shaft 408 is attached to hub 404, shaft 408 rotates about rotational axis 411 as well. Orbital ring 432 is disposed between sleeve 406 and shaft 408 and is configured to rotate about rotational axis 411 at an angular velocity that is less than the angular velocity of hub 404 as previously described herein. Orbital ring 432 is further configured to include a recirculation channel 428. In addition, FDB motor assembly 400 also may be configured such that a downward acting preloading force is exerted on hub 404 as previously described herein.

As FIG. 4 also shows, FDB motor assembly 400 includes fluid dynamic journal bearings 420 and 422 and fluid dynamic thrust bearings 424 and 426. Fluid dynamic journal bearing 420 is disposed between orbital ring 432 and shaft 408 on one side of recirculation channel 428, and fluid dynamic journal bearing 422 is disposed between orbital ring 432 and sleeve 406 on the opposite side of recirculation channel 428. Fluid dynamic thrust bearing 424 is disposed between orbital ring 432 and displacement limiter ring 414, and fluid dynamic thrust bearing 426 is disposed between orbital ring 428 and counter plate 430. As previously described in conjunction with FIG. 3, each of fluid dynamic journal bearings 420 and 424 and fluid dynamic thrust bearings 424 and 426 includes at least one bearing surface having a grooved bearing pattern. Again, these grooved bearing surfaces may include any suitable type of grooved bearing pattern, including, without limitation, a pattern of spiral grooves or a pattern of chevron grooves. Further, as persons skilled in the art will recognize, any of shaft 408, orbital ring 432, sleeve 406 or displacement limiter ring 414 may include one or more bearing surfaces having a grooved bearing pattern. Persons skilled in the art also will understand that a fluid dynamic bearing may comprise one or more sets of grooves.

In a preferred approach, fluid dynamic journal bearings 420 and 422 are configured asymmetrically such that each pumps bearing fluid towards a corner 470 and 471, respectively. Fluid dynamic thrust bearing 424 is configured asymmetrically such that it generates a net inward pumping action toward corner 470. Fluid dynamic thrust bearing 426 is configured asymmetrically such that it pumps bearing fluid towards corner 471. Further, fluid dynamic journal bearings 420 and 422 and fluid dynamic thrust bearings 424 and 426 are configured to generate a bearing fluid flow about orbital ring 432 and through recirculation channel 428 as depicted by arrows 440 and 442.

In alternative embodiments, each of fluid dynamic journal bearings 420 and 422 and fluid dynamic thrust bearings 424 and 426 may have any configuration and may pump bearing fluid in any direction so long as orbital ring 432 functions as intended. Further, each such bearing may be disposed in any suitable location. Persons skilled in the art therefore will recognize that neither the configurations nor the locations of fluid dynamic journal bearings 420 and 422 or fluid dynamic thrust bearings 424 and 426 in any way limits the scope of the invention.

Among other things, recirculation channel 428 accommodates bearing fluid flow induced by fluid dynamic journal bearings 420 and 422 and fluid dynamic thrust bearings 424 and 426 and enforces favorable pressure boundary conditions between fluid dynamic bearing regions. As configured, the pressure within and at each end of recirculation channel 428 remains at approximately ambient pressure. Further, as no fluid dynamic bearing is disposed between recirculation channel 428 and the bottom surface of shaft 408, the pressure at the bottom surface of shaft 408 also remains at approximately ambient pressure. As a general matter, however, recirculation channel 428 may be configured in any way that creates the desired bearing fluid flow about orbital ring 432 and the desired boundary conditions between fluid dynamic bearing regions. Persons skilled in the art will therefore recognize that the configuration of recirculation channel 428 in no way limits the scope of the invention.

Counter plate 430 is attached to sleeve 406. The top surface of counter plate 430 is configured to provide a bearing surface for fluid dynamic thrust bearing 426.

Displacement limiter ring 414 is attached to shaft 408 and rotates about rotational axis 411 with shaft 408. Displacement limiter ring 414 is configured to provide a seal surface 413 to the extent that seal 412 comprises a capillary seal. The bottom surface of displacement limiter ring 414 is configured to provide a bearing surface for fluid dynamic thrust bearing 424. In addition, as displacement limiter ring 414 is disposed in close proximity to an overhang 407 of sleeve 406, displacement limiter ring 414 is configured to contact against overhang 407 to limit the upward displacement of hub 404 and shaft 408 when FDB motor assembly 400 experiences displacement shocks in the axially upward direction.

Again, persons skilled in the art will understand that the same general principles and concepts described above in conjunction with FIG. 3 apply with equal force to the embodiment described above in conjunction with FIG. 4.

Figure 5:
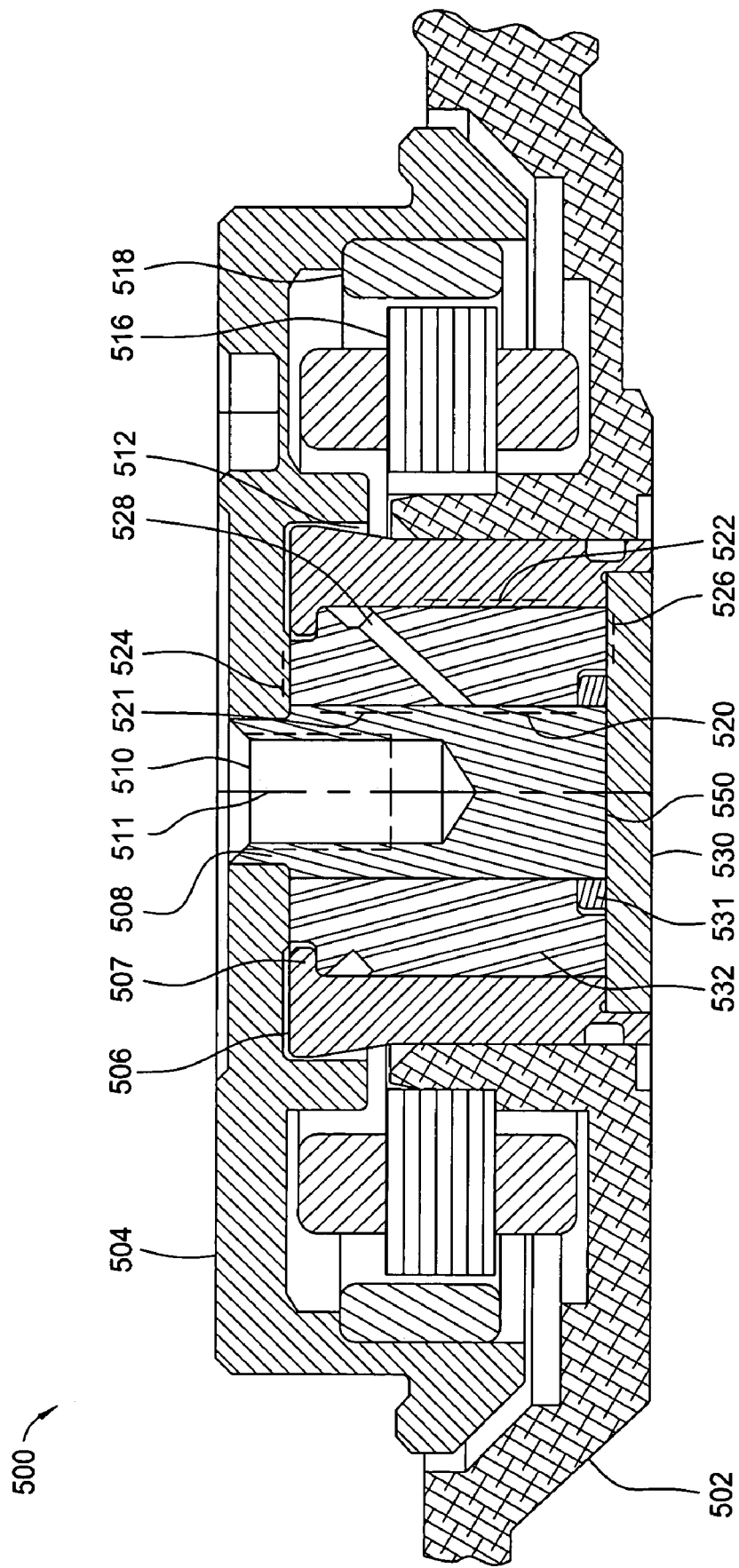
FIG. 5 is a cross-sectional view illustrating an orbital ring in a fluid dynamic bearing motor assembly, according to another alternative embodiment of the invention.

FIG. 5 is a cross-sectional view illustrating an orbital ring 532 in a fluid dynamic bearing motor assembly 500, according to another alternative embodiment of the invention. As shown, FDB motor assembly 500 may include, without limitation, a base 502, a hub 504, a sleeve 506, a shaft 508, a seal 512, a stator assembly 516, a magnet 518, a counter plate 530, a displacement limiter ring 531 and orbital ring 532.

Sleeve 506 is attached to base 502 and supports FDB motor assembly 500. As configured, sleeve 506 is stationary. Shaft 508 is attached to hub 504, which is configured to rotate about a rotational axis 511. Specifically, magnet 518 is attached to hub 504, and the electromagnetic interaction between magnet 518 and stator assembly 516 causes hub 504 to rotate. As shaft 508 is attached to hub 504, shaft 508 rotates about rotational axis 511 as well. Orbital ring 532 is disposed between sleeve 506 and shaft 508 and is configured to rotate about rotational axis 511 at an angular velocity that is less than the angular velocity of hub 504 as previously described herein. Orbital ring 532 is further configured to include a recirculation channel 528. In addition, FDB motor assembly 500 also may be configured such that a downward acting preloading force is exerted on hub 504 as previously described herein.

As FIG. 5 also shows, FDB motor assembly 500 includes fluid dynamic journal bearings 520, 521 and 522 and fluid dynamic thrust bearings 524 and 526. Fluid dynamic journal bearings 520 and 521 are disposed between orbital ring 532 and shaft 508 on opposites sides of recirculation channel 528. Fluid dynamic journal bearing 522 is disposed between orbital ring 532 and sleeve 506 on the same side of recirculation channel 528 as fluid dynamic journal bearing 520. Fluid dynamic thrust bearing 524 is disposed between orbital ring 532 and hub 504, and fluid dynamic thrust bearing 526 is disposed between orbital ring 532 and counter plate 530.

Counter plate 530 is attached to sleeve 506. The top surface of thrust place 530 is configured to provide a bearing surface for fluid dynamic thrust bearing 526. In addition, the bottom surface of hub 504 is configured to provide a bearing surface for fluid dynamic thrust bearing 524.

Displacement limiter ring 531 is attached to shaft 508 and is disposed under part of orbital ring 532. In addition, orbital ring 532 is configured such that an overhang 507 of sleeve 506 is disposed over part of orbital ring 532. As persons skilled in the art will recognize, displacement limiter ring 531 and overhang 507 are configured to act together to limit the upward displacement of hub 504 and shaft 508 when FDB motor assembly 500 experiences displacement shocks in the axially upward direction.

As persons skilled in the art will recognize, the configuration of FDB motor assembly 500 is generally similar to that of FDB motor assembly 400. One difference, however, is that FDB motor assembly 500 has two fluid dynamic journal bearings, fluid dynamic journal bearings 520 and 521, disposed between orbital ring 532 and shaft 508 as opposed to one. One reason for this configuration is that the heights of orbital ring 532 and shaft 508 may be greater than those of orbital ring 432 and shaft 408 as depicted in FDB motor assembly 400 of FIG. 4. As persons skilled in the art will understand, greater effective angular and radial stiffness is desirable to compensate for the increased heights. As configured, the radial stiffnesses of fluid dynamic journal bearings 520 and 521 act in parallel, thereby increasing the effective angular and radial stiffness supporting shaft 508. Another difference is that, in this embodiment, fluid dynamic journal bearing 520 is disposed between recirculation channel 528 and the bottom surface of shaft 508. As a result, positive pressure is maintained in a gap 550 between the bottom surface of shaft 508 and the top surface of counter plate 530. Among other things, the positive pressure in gap 550 supplements the axial forces generated by fluid dynamic thrust bearings 524 and 526.

Again, persons skilled in the art will understand that the same general principles and concepts described above in conjunction with FIGS. 3 and 4 apply with equal force to the embodiment described above in conjunction with FIG. 5.

Figure 6:
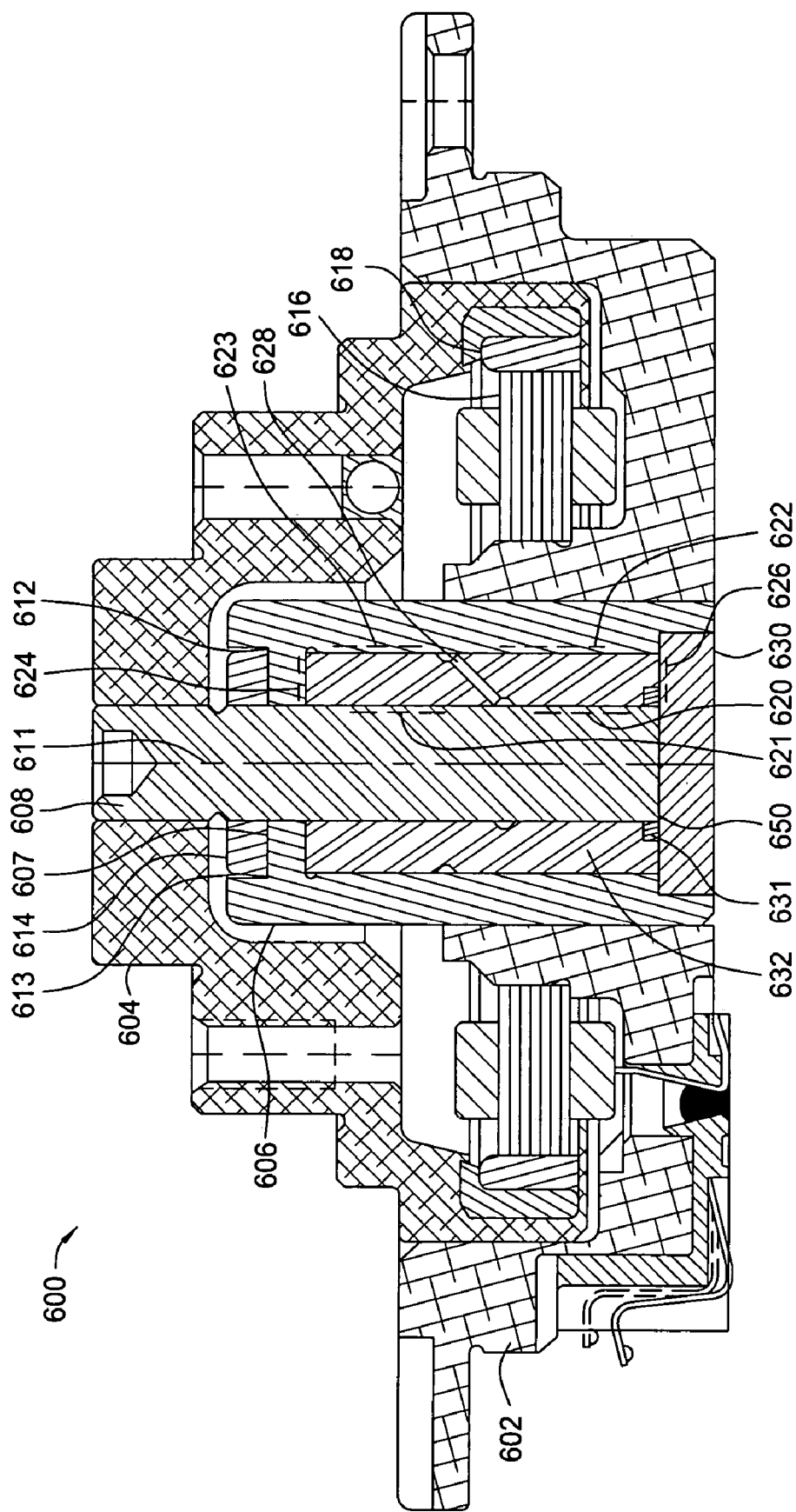
FIG. 6 is a cross-sectional view illustrating an orbital ring in a fluid dynamic bearing motor assembly, according to another alternative embodiment of the invention.

FIG. 6 is a cross-sectional view illustrating an orbital ring 632 in a fluid dynamic bearing motor assembly 600, according to another alternative embodiment of the invention. As shown, FDB motor assembly 600 may include, without limitation, a base 602, a hub 604, a sleeve 606, a shaft 608, a seal 612, a seal ring 614, a stator assembly 616, a magnet 618, a counter plate 630, a displacement limiter ring 631 and orbital ring 632.

Sleeve 606 is attached to base 602 and supports FDB motor assembly 600. As configured, sleeve 606 is stationary. Sleeve 606 is further configured such that seal ring 614 may be disposed within the top portion of sleeve 606 as depicted. Shaft 608 is attached to hub 604, which is configured to rotate about a rotational axis 611. Specifically, magnet 618 is attached to hub 604, and the electromagnetic interaction between magnet 618 and stator assembly 616 causes hub 604 to rotate. As shaft 608 is attached to hub 604, shaft 608 rotates about rotational axis 611 as well. Orbital ring 632 is disposed between sleeve 606 and shaft 608 and is configured to rotate about rotational axis 611 at an angular velocity that is less than the angular velocity of hub 604 as previously described herein. Orbital ring 632 is further configured to include a recirculation channel 628. In addition, FDB motor assembly 600 also may be configured such that a downward acting preloading force is exerted on hub 604 as previously described herein.

As FIG. 6 also shows, FDB motor assembly 600 includes fluid dynamic journal bearings 620, 621, 622 and 623 and fluid dynamic thrust bearings 624 and 626. Fluid dynamic journal bearings 620 and 621 are disposed between orbital ring 632 and shaft 608 on opposites sides of recirculation channel 628. Fluid dynamic journal bearings 622 and 623 are disposed between orbital ring 632 and sleeve 606 on opposite sides of recirculation channel 628. Fluid dynamic thrust bearing 624 is disposed between orbital ring 632 and an overhang 607 of sleeve 606, and fluid dynamic thrust bearing 626 is disposed between orbital ring 632 and counter plate 630.

Counter plate 630 is attached to sleeve 606. The top surface of counter plate 630 is configured to provide a bearing surface for fluid dynamic thrust bearing 626. In addition, the bottom surface of an overhang 607 of sleeve 606 is configured to provide a bearing surface for fluid dynamic thrust bearing 624. Seal ring 614 is attached to shaft 608 and is configured to provide a seal surface 613 to the extent that seal 612 comprises a capillary seal.

Displacement limiter ring 631 is attached to shaft 608 and is disposed under part of orbital ring 632. In addition, overhang 607 is disposed over orbital ring 632. As persons skilled in the art will recognize, displacement limiter ring 631 and overhang 607 are configured to act together to limit the upward displacement of hub 604 and shaft 608 when FDB motor assembly 600 experiences displacement shocks in the axially upward direction.

As persons skilled in the art will recognize, the configuration of FDB motor assembly 600 is generally similar to that of FDB motor assembly 400. One difference, however, is that FDB motor assembly 600 includes two fluid dynamic bearings, fluid dynamic journal bearings 620 and 621, disposed between orbital ring 632 and shaft 608 and two fluid dynamic bearings, fluid dynamic journal bearings 622 and 623, disposed between orbital ring 632 and sleeve 606. One reason for this configuration is that orbital ring 632 and shaft 608 may have heights that are greater than those of orbital ring 432 and shaft 408 as depicted in FDB motor assembly 400 of FIG. 4. As configured, the angular and radial stiffnesses of fluid dynamic journal bearings 620 and 621 and of fluid dynamic journal bearings 622 and 623 act in parallel, thereby increasing the effective angular and radial stiffness supporting orbital ring 632 and shaft 608. As previously described herein, increasing the effective radial stiffness compensates for the increased heights of orbital ring 632 and shaft 608. Another difference is that, in this embodiment, fluid dynamic journal bearings 620 and 622 and fluid dynamic thrust bearing 626 are disposed between recirculation channel 628 and the bottom surface of shaft 608. As a result, positive pressure is maintained in a gap 650 between the bottom surface of shaft 608 and the top surface of counter plate 630. Among other things, the positive pressure in gap 650 supplements the axial forces generated by fluid dynamic thrust bearings 624 and 626.

Again, persons skilled in the art will understand that the same general principles and concepts described above in conjunction with FIGS. 3 through 5 apply with equal force to the embodiment described above in conjunction with FIG. 6.

Figure 7:
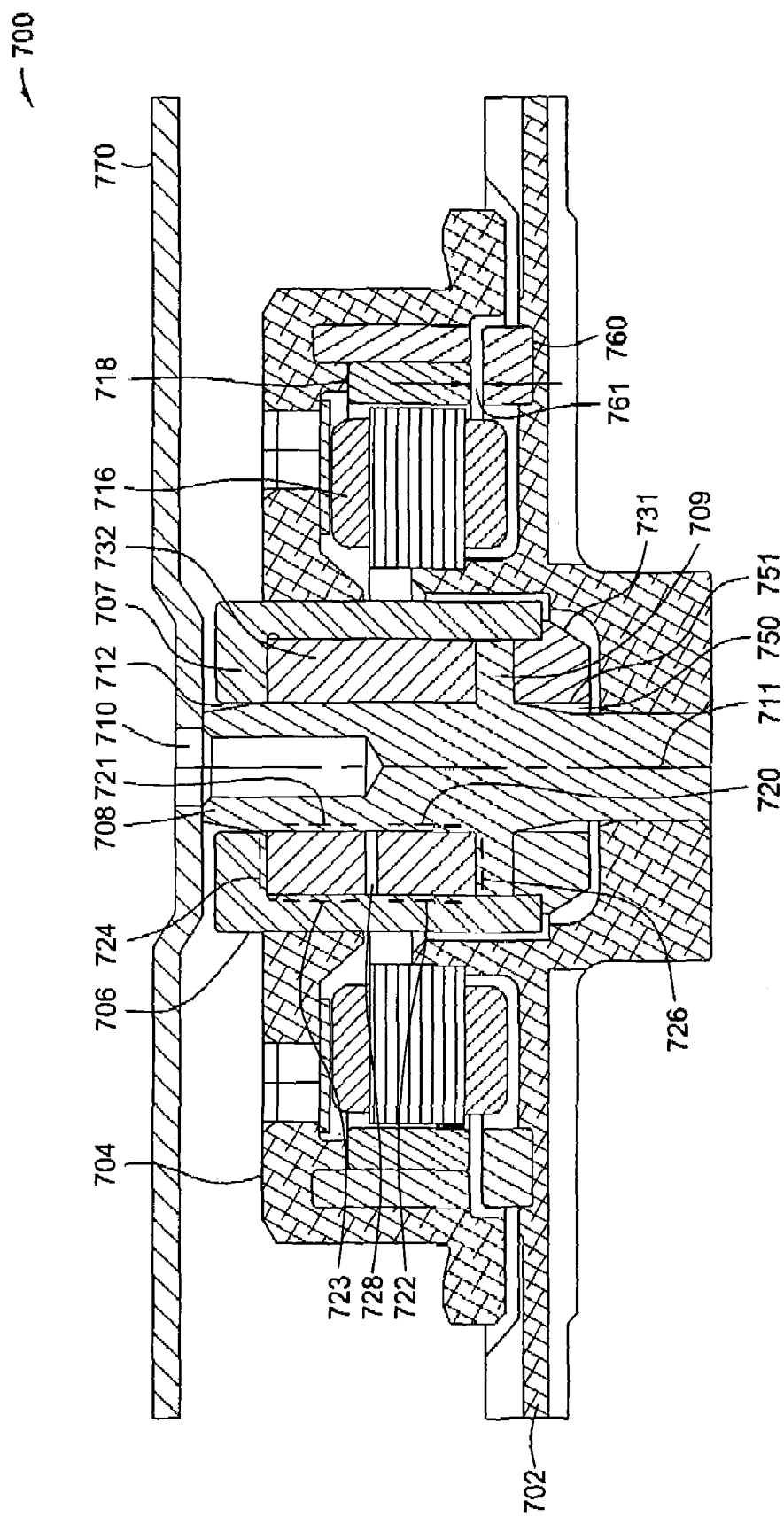
FIG. 7 is a cross-sectional view illustrating an orbital ring in a fluid dynamic bearing motor assembly, according to another alternative embodiment of the invention.

FIG. 7 is a cross-sectional view illustrating an orbital ring 732 in a fluid dynamic bearing motor assembly 700, according to another alternative embodiment of the invention. As shown, FDB motor assembly 700 may include, without limitation, a base 702, a hub 704, a sleeve 706, a shaft 708, seals 712 and 750, a stator assembly 716, a magnet 718, a displacement limiter 731, orbital ring 732, a metal ring 760 and a top cover 770.

Base 702 comprises a nonmagnetic material such as aluminum. Shaft 708 is attached to base 702 and supports FDB motor assembly 700. In this embodiment, shaft 708 is stationary. Top cover 770 is attached to shaft 708. In one embodiment, top cover 770 is attached to shaft 708 with a screw through a threaded hole 710. Hub 704 is configured to rotate about a rotational axis 711. Specifically, magnet 718 is attached to hub 704, and the electromagnetic interaction between magnet 718 and stator assembly 716 causes hub 704 to rotate. Sleeve 706 is attached to hub 704 and rotates about rotational axis 711 as well. Orbital ring 732 is disposed between sleeve 706 and shaft 708 and is configured to rotate about rotational axis 711 at an angular velocity that is less than the angular velocity of hub 704 as previously described herein. Orbital ring 732 is further configured to include a recirculation channel 728.

FDB motor assembly 700 also is configured such that a downward acting preloading force is exerted on hub 704. Specifically, metal ring 760 comprises a magnetic metal such as a Series 400 steel or a low carbon steel. In such a configuration, a downward acting magnetic force results that pulls magnet 718 (and hub 704) towards base 702. The magnitude of such a magnetic force is a function of, among other things, the size of a gap 761.

As FIG. 7 also shows, FDB motor assembly 700 includes fluid dynamic journal bearings 720, 721, 722 and 723 and fluid dynamic thrust bearings 724 and 726. Fluid dynamic journal bearings 720 and 721 are disposed between orbital ring 732 and shaft 708 on opposites sides of recirculation channel 728. Fluid dynamic journal bearings 722 and 723 are disposed between orbital ring 732 and sleeve 706 on opposite sides of recirculation channel 728. Fluid dynamic thrust bearing 724 is disposed between orbital ring 732 and an overhang 707 of sleeve 706, and fluid dynamic thrust bearing 726 is disposed between orbital ring 732 and a flange 709 of shaft 708.

Displacement limiter 731 is attached to sleeve 706 and is configured to provide a seal surface 751 to the extent that seal 750 comprises a capillary seal. As shown, the top surface of displacement limiter 731 is disposed under a flange 709 of shaft 708. As persons skilled in the art will recognize, displacement limiter 731 and flange 709 are configured to act together to limit the upward displacement of hub 704 when FDB motor assembly 700 experiences displacement shocks in the axially upward direction.

As persons skilled in the art will recognize, the configuration of FDB motor assembly 700 is generally similar to that of FDB motor assemblies 300. One difference, however, is that FDB motor assembly 700 includes two fluid dynamic bearings, fluid dynamic journal bearings 720 and 721, disposed between orbital ring 732 and shaft 708 and two fluid dynamic bearings, fluid dynamic journal bearings 722 and 723, disposed between orbital ring 732 and sleeve 706. Again, as previously described herein, one reason for this configuration is to increase the effective stiffness supporting orbital ring 732 and sleeve 706 to compensate for the increased heights of those elements. Other differences include the presence of recirculation channel 728 and attachment of shaft 708 to top cover 770.

Again, persons skilled in the art will understand that the same general principles and concepts described above in conjunction with FIGS. 3 through 6 apply with equal force to the embodiment described above in conjunction with FIG. 7.

Figure 8:
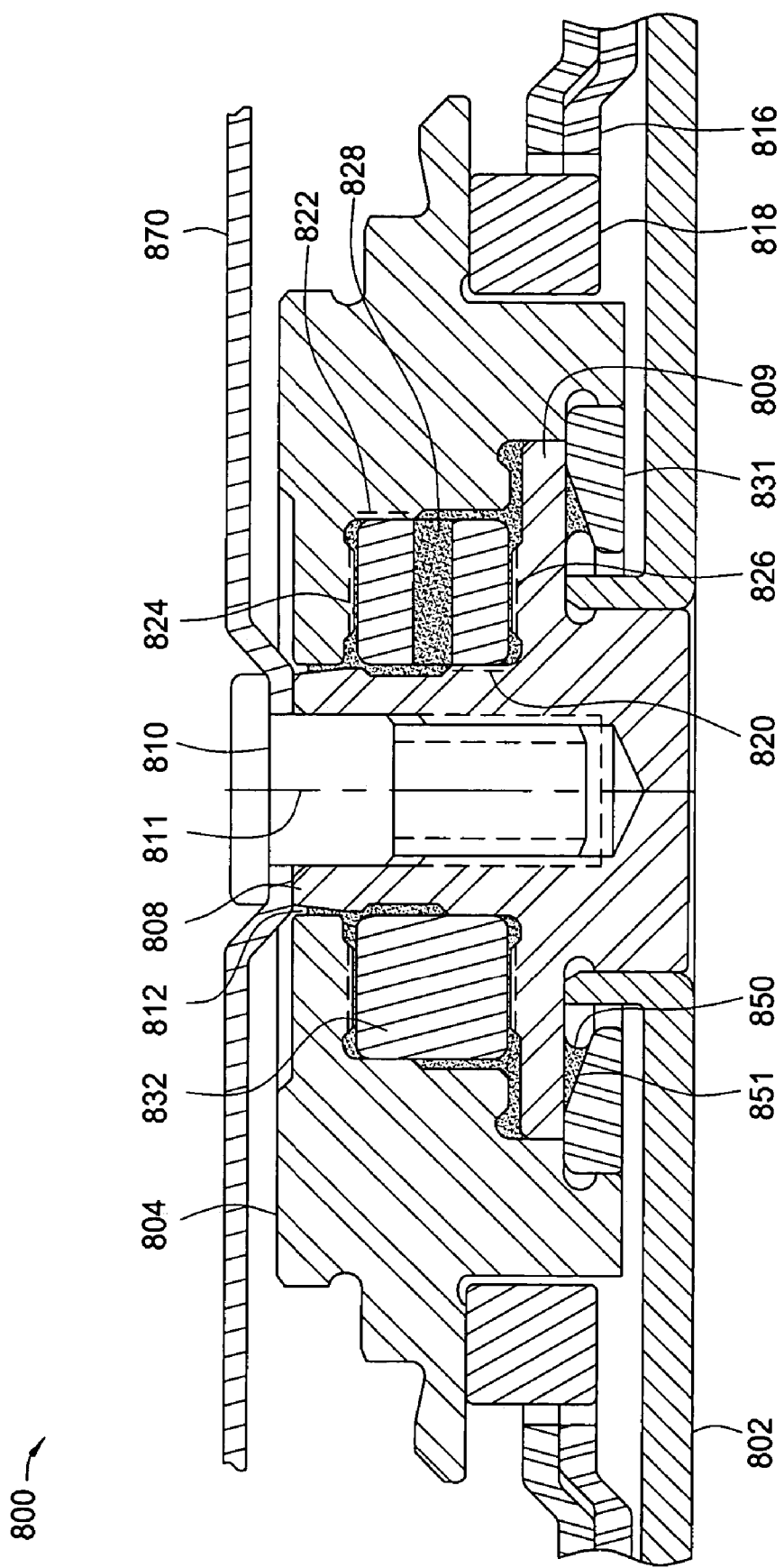
FIG. 8 is a cross-sectional view illustrating an orbital ring in a fluid dynamic bearing motor assembly, according to another alternative embodiment of the invention.

FIG. 8 is a cross-sectional view illustrating an orbital ring 832 in a fluid dynamic bearing motor assembly 800, according to another alternative embodiment of the invention. As shown, FDB motor assembly 800 may include, without limitation, a base 802, a hub 804, a shaft 808, seals 812 and 850, a stator assembly 816 (partially shown), a magnet 818, a displacement limiter 831, orbital ring 832 and a top cover 870.

Shaft 808 is attached to base 802 and supports FDB motor assembly 800. In this embodiment, shaft 808 is stationary. Top cover 870 is attached to shaft 808. In one embodiment, top cover 870 is attached to shaft 808 with a screw 810. Hub 804 is configured to rotate about a rotational axis 811. Specifically, magnet 818 is attached to hub 804, and the electromagnetic interaction between magnet 818 and stator assembly 816 causes hub 804 to rotate. Orbital ring 832 is disposed between hub 804 and shaft 808 and is configured to rotate about rotational axis 811 at an angular velocity that is less than the angular velocity of hub 804 as previously described herein. Orbital ring 832 is further configured to include a recirculation channel 828. In addition, FDB motor assembly 800 also may be configured such that a downward acting preloading force is exerted on hub 804 as previously described herein.

As FIG. 8 also shows, FDB motor assembly 800 includes fluid dynamic journal bearings 820 and 822 and fluid dynamic thrust bearings 824 and 826. Fluid dynamic journal bearing 820 is disposed between orbital ring 832 and shaft 808 on one side of recirculation channel 828, and fluid dynamic journal bearing 822 is disposed between orbital ring 832 and hub 804 on the opposite side of recirculation channel 828. Fluid dynamic thrust bearing 824 is disposed between orbital ring 832 and hub 804, and fluid dynamic thrust bearing 826 is disposed between orbital ring 832 and shaft 808.

Displacement limiter 831 is attached to hub 804 and is configured to provide a seal surface 851 to the extent that seal 850 comprises a capillary seal. As shown, the top surface of displacement limiter 831 is disposed under a flange 809 of shaft 808 such that displacement limiter 831 limits the upward displacement of hub 804 when FDB motor assembly 800 experiences displacement shocks in the axially upward direction.

As persons skilled in the art will recognize, the configuration of FDB motor assembly 800 is generally similar to that of FDB motor assembly 300. One difference, however, is that orbital ring 832 includes recirculation channel 828. Another difference is the attachment of shaft 808 to top cover 870, which may require the use of two seals 812 and 850.

Again, persons skilled in the art will understand that the same general principles and concepts described above in conjunction with FIGS. 3 through 7 apply with equal force to the embodiment described above in conjunction with FIG. 8.

Figure 9:
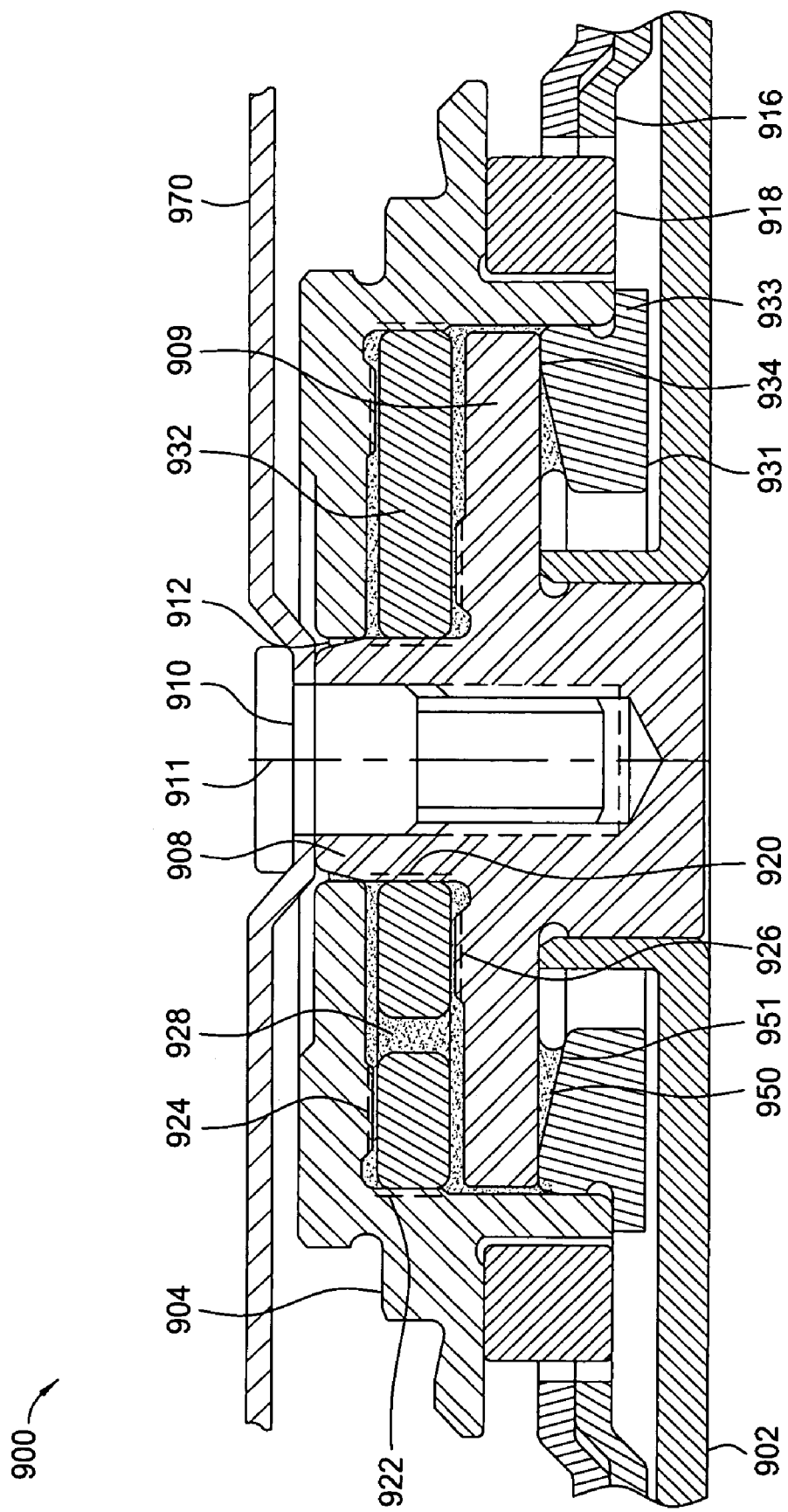
FIG. 9 is a cross-sectional view illustrating an orbital ring in a fluid dynamic bearing motor assembly, according to another alternative embodiment of the invention.

FIG. 9 is a cross-sectional view illustrating an orbital ring 932 in a fluid dynamic bearing motor assembly 900, according to another alternative embodiment of the invention. As shown, FDB motor assembly 900 may include, without limitation, a base 902, a hub 904, a shaft 908, seals 912 and 950, a stator assembly 916 (partially shown), a magnet 918, a displacement limiter 931, orbital ring 932 and a top cover 970.

Shaft 908 is attached to base 902 and supports FDB motor assembly 900. In this embodiment, shaft 908 is stationary. Top cover 970 is attached to shaft 908. In one embodiment, top cover 970 is attached to shaft 908 with a screw 910. Hub 904 is configured to rotate about a rotational axis 911. Specifically, magnet 918 is attached to hub 904, and the electromagnetic interaction between magnet 918 and stator assembly 916 causes hub 904 to rotate. Orbital ring 932 is disposed between hub 904 and shaft 908 and is configured to rotate about rotational axis 911 at an angular velocity that is less than the angular velocity of hub 904 as previously described herein. Orbital ring 932 is further configured to include a recirculation channel 928. In addition, FDB motor assembly 900 also may be configured such that a downward acting preloading force is exerted on hub 904 as previously described herein.

As FIG. 9 also shows, FDB motor assembly 900 includes fluid dynamic journal bearings 920 and 922 and fluid dynamic thrust bearings 924 and 926. Fluid dynamic journal bearing 920 is disposed between orbital ring 932 and shaft 908, and fluid dynamic journal bearing 922 is disposed between orbital ring 932 and hub 904. Fluid dynamic thrust bearing 924 is disposed between orbital ring 932 and hub 904 on one side of recirculation channel 928, and fluid dynamic thrust bearing 926 is disposed between orbital ring 932 and shaft 908 on the opposite side of recirculation channel 928.

Displacement limiter 931 is configured to provide a seal surface 951 to the extent that seal 950 comprises a capillary seal. Displacement limiter 931 is further configured with a lip 933 and a shoulder 934. As shown, lip 933 is disposed under part of hub 904 and shoulder 934 is disposed in close proximity to a flange 909 of shaft 908. As configured, lip 933 and shoulder 934 act together to limit the upward displacement of hub 904 when FDB motor assembly 900 experiences displacement shocks in the axially upward direction.

As persons skilled in the art will recognize, the configuration of FDB motor assembly 900 is generally similar to that of FDB motor assembly 800. One difference, however, is that in this embodiment recirculation channel 928 has a vertical, as opposed to a horizontal, orientation.

Again, persons skilled in the art will understand that the same general principles and concepts described above in conjunction with FIGS. 3 through 8 apply with equal force to the embodiment described above in conjunction with FIG. 9.

Figure 10:
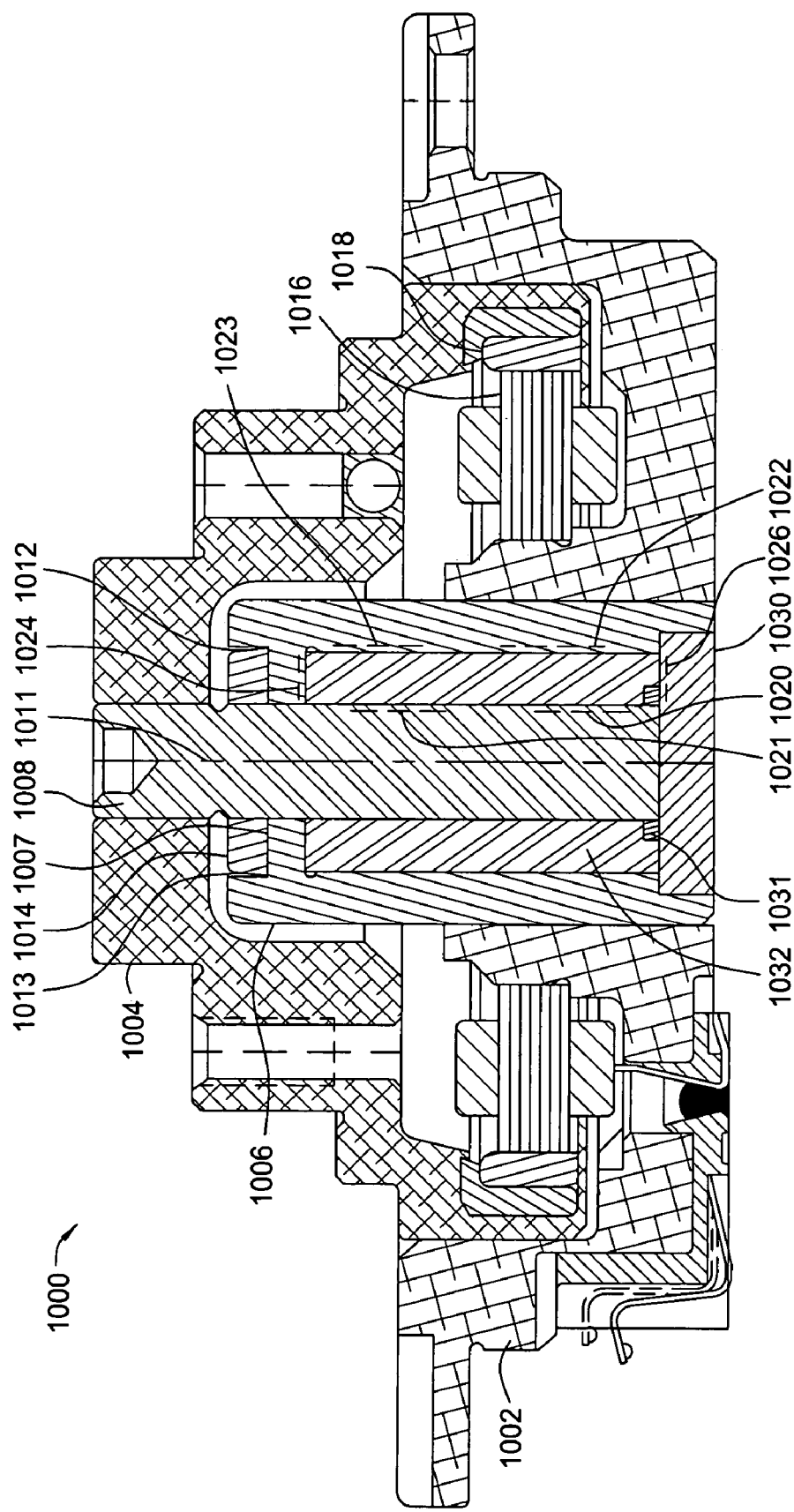
FIG. 10 is a cross-sectional view illustrating an orbital ring in a fluid dynamic bearing motor assembly, according to yet another alternative embodiment of the invention.

FIG. 10 is a cross-sectional view illustrating an orbital ring 1032 in a fluid dynamic bearing motor assembly 1000, according to another alternative embodiment of the invention. As shown, FDB motor assembly 1000 may include, without limitation, a base 1002, a hub 1004, a sleeve 1006, a shaft 1008, a seal 1012, a seal ring 1014, a stator assembly 1016, a magnet 1018, a counter plate 1030, a displacement limiter ring 1031 and orbital ring 1032.

Sleeve 1006 is attached to base 1002 and supports FDB motor assembly 1000. As configured, sleeve 1006 is stationary. Sleeve 1006 is further configured such that seal ring 1014 may be disposed within the top portion of sleeve 1006 as depicted. Shaft 1008 is attached to hub 1004, which is configured to rotate about a rotational axis 1011. Specifically, magnet 1018 is attached to hub 1004, and the electromagnetic interaction between magnet 1018 and stator assembly 1016 causes hub 1004 to rotate. As shaft 1008 is attached to hub 1004, shaft 1008 rotates about rotational axis 1011 as well. Orbital ring 1032 is disposed between sleeve 1006 and shaft 1008 and is configured to rotate about rotational axis 1011 at an angular velocity that is less than the angular velocity of hub 1004 as previously described herein. In addition, FDB motor assembly 1000 also may be configured such that a downward acting preloading force is exerted on hub 1004 as previously described herein.

As FIG. 10 also shows, FDB motor assembly 1000 includes fluid dynamic journal bearings 1020, 1021, 1022 and 1023 and fluid dynamic thrust bearings 1024 and 1026. Fluid dynamic journal bearings 1020 and 1021 are disposed between orbital ring 1032 and shaft 1008, and fluid dynamic journal bearings 1022 and 1023 are disposed between orbital ring 1032 and sleeve 1006. Fluid dynamic thrust bearing 1024 is disposed between orbital ring 1032 and an overhang 1007 of sleeve 1006, and fluid dynamic thrust bearing 1026 is disposed between orbital ring 1032 and counter plate 1030.

Counter plate 1030 is attached to sleeve 1006. The top surface of counter plate 1030 is configured to provide a bearing surface for fluid dynamic thrust bearing 1026. In addition, the bottom surface of an overhang 1007 of sleeve 1006 is configured to provide a bearing surface for fluid dynamic thrust bearing 1024. Seal ring 1014 is attached to shaft 1008 and is configured to provide a seal surface 1013 to the extent that seal 1012 comprises a capillary seal.

Displacement limiter ring 1031 is attached to shaft 1008 and is disposed under part of orbital ring 1032. In addition, overhang 1007 is disposed over orbital ring 1032. As persons skilled in the art will recognize, displacement limiter ring 1031 and overhang 1007 are configured to act together to limit the upward displacement of hub 1004 and shaft 1008 when FDB motor assembly 1000 experiences displacement shocks in the axially upward direction.

As persons skilled in the art will recognize, the configuration of FDB motor assembly 1000 is generally similar to that of FDB motor assembly 600. One difference, however, is that FDB motor assembly 1000 does not include recirculation channel 628 of FIG. 6.

Again, persons skilled in the art will understand that the same general principles and concepts described above in conjunction with FIGS. 3 through 9 apply with equal force to the embodiment described above in conjunction with FIG. 10.

In sum, the above discloses several embodiments of an FDB motor assembly configured with an orbital ring. As depicted, the FDB motor assembly has an inner member or shaft that is configured either to remain stationary or to rotate and has an outer member that is configured to either to remain stationary or rotate. In some embodiments, the outer member is a sleeve and, in other embodiments, the outer member is a hub. The orbital ring is disposed between the inner and outer members and is configured to rotate at an angular velocity that is less than the angular velocity of the hub. The FDB motor also includes at least one fluid dynamic bearing disposed between the inner member and the orbital ring and at least one fluid dynamic bearing disposed between the orbital ring and the outer member. Each such fluid dynamic bearing has an associated bearing region through which bearing fluid flows. As persons skilled in the art will recognize, fluid dynamic bearings generally are configured such that positive pressure is maintained in those bearing regions by the pumping action of grooves. In some embodiments, the orbital ring includes a recirculation channel, which is configured to accommodate bearing fluid flow induced by the fluid dynamic bearings and to control pressure in the bearing regions.

One advantage of the FDB motor assemblies described above is that they all consume substantially less power than similar FDB motor assemblies that do not include orbital rings. Further, if the gap sizes of the fluid dynamic bearings included in the disclosed FDB motor assemblies are decreased sufficiently, the effective radial, angular and axial stiffnesses of those fluid dynamic bearings do not decrease appreciably, yet resulting viscous torque losses are substantially lower.

The invention has been described above with reference to specific embodiments. Persons skilled in the art, however, will understand that various modifications and changes may be made thereto without departing from the broader spirit and scope of the invention as set forth in the appended claims.

For example, in each embodiment described herein, the orbital ring has a rectangular cross-sectional configuration. In other embodiments, however, the orbital ring may have any type of cross-sectional configuration that allows the orbital ring to function as intended. For example, in alternative embodiments, the orbital ring may have a triangular cross-sectional configuration. As persons skilled in the art will recognize, with such a configuration, the orbital ring may have three or more bearing surfaces, with at least one being disposed on each side of the orbital ring. In other alternative embodiments, the orbital ring may have a circular or oval-shaped cross-sectional configuration. With such a configuration, the orbital ring may have two or more bearing surfaces so long as each stretches over an appropriate arc. In yet other alternative embodiments, the cross-section of the orbital ring may be configured as any type of polygon having five or more sides. Persons skilled in the art therefore will recognize that the cross-sectional configuration of the orbital ring in no way limits the scope of the invention.

In addition, any suitable number of fluid dynamic bearings may be disposed along any of the surfaces of the orbital ring. Also, various recirculation channel configurations may be employed to achieve various fluid flow and pressure boundary condition effects as dictated by individual design requirements.

Further, any embodiment of the FDB motor assembly may be included in any type of electronic device that may use a precision motor. Such electronic devices include, without limitation, any type of magnetic disc drive or optical disc drive or any type of optical disc player such as a compact disc player or a digital versatile disc ("DVD") player.

Finally, the fluid dynamic bearing assembly disclosed herein has been described in the context of various embodiments of an FDB motor assembly. The fluid dynamic bearing assembly, however, may be embodied in any other system or apparatus as deemed appropriate by a person ordinarily skilled in the art. For example, a pair of cartridges, each comprising an inner race, an outer race and an orbital ring with fluid between a groove section and each of the inner and outer races, could be used to support a shaft and a sleeve for relative rotation, replacing a pair of ball bearings as previously used. The cartridges would be spaced along the shaft and would be preloaded to provide the requisite axial and radial support.

As the foregoing shows, the descriptions and drawings set forth herein should be regarded in an illustrative rather than a restrictive sense.

What is claimed is:

1. A fluid dynamic bearing motor assembly, the assembly comprising:
   an inner member;
   an outer member configured to rotate about a rotational axis at a first angular velocity; and
   an orbital ring disposed between the inner member and the outer member, the orbital ring configured to rotate about the rotational axis at a second angular velocity, the second angular velocity being less than the first angular velocity, wherein at least one fluid dynamic bearing region is associated with a gap between a surface of the orbital ring and a surface of one or both of the inner member and the outer member, the fluid dynamic bearing region operable to provide an axial thrust.

2. The assembly of claim 1, further comprising a first fluid dynamic bearing, defining a first bearing region, disposed between the inner member and the orbital ring and a second fluid dynamic bearing, defining a second bearing region, disposed between the orbital ring and the outer member.

3. The assembly of claim 2, wherein the first fluid dynamic bearing and the second fluid dynamic bearing are configured such that positive pressure is maintained in the first bearing region and the second bearing region.

4. The assembly of claim 1, wherein die orbital ring is configured with a rectangular cross-section.

5. A fluid dynamic bearing motor assembly, the assembly comprising:
   an inner member;
   an outer member configured to rotate about a rotational axis at a first angular velocity; and
   an orbital ring disposed between the inner member and the outer member, the orbital ring having a recirculation channel and configured to rotate about the rotational axis at a second angular velocity, the second angular velocity being less than the first angular velocity, wherein at least one fluid dynamic bearing region is associated with a gap between a surface of the orbital ring and a surface of one or both of the inner member and the outer member, the fluid dynamic bearing region operable to provide an axial thrust.

6. A fluid dynamic bearing assembly, the assembly comprising:
- an inner member;
- an outer member configured to rotate about a rotational axis at a first angular velocity; and
- an orbital ring disposed between the inner member and the outer member, the orbital ring configured to rotate about the rotational axis at a second angular velocity, the second angular velocity being less than the first angular velocity, wherein at least one fluid dynamic bearing region is associated with a gap between a surface of the orbital ring and a surface of one or both of the inner member and the outer member, the fluid dynamic bearing region operable to provide an axial thrust.

7. A fluid dynamic bearing assembly, the assembly comprising:
- an inner member;
- an outer member configured to rotate about a rotational axis at a first angular velocity; and
- an orbital ring disposed between the inner member and the outer member, the orbital ring having a recirculation channel and configured to rotate about the rotational axis at a second angular velocity, the second angular velocity being less than the first angular velocity, wherein at least one fluid dynamic bearing region is associated with a gap between a surface of the orbital ring and a surface of one or both of the inner member and the outer member, the fluid dynamic bearing region operable to provide an axial thrust.

* * * * *